US012623621B2

(12) United States Patent
Choi

(10) Patent No.: US 12,623,621 B2
(45) Date of Patent: May 12, 2026

(54) REAR OCCUPANT ALERT DEVICE AND METHOD THEREFOR

(71) Applicant: LG INNOTEK CO., LTD., Seoul (KR)

(72) Inventor: Jae Yeon Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/834,201

(22) PCT Filed: Jan. 26, 2023

(86) PCT No.: PCT/KR2023/001216
§ 371 (c)(1),
(2) Date: Jul. 29, 2024

(87) PCT Pub. No.: WO2023/146313

PCT Pub. Date: Aug. 3, 2023

(65) Prior Publication Data

US 2025/0115206 A1     Apr. 10, 2025

(30) Foreign Application Priority Data

Jan. 27, 2022     (KR) ........................ 10-2022-0012608

(51) Int. Cl.
*B60R 21/015*     (2006.01)
*B60R 21/01*     (2006.01)

(52) U.S. Cl.
CPC .. *B60R 21/01542* (2014.10); *B60R 21/01534* (2014.10); *B60R 2021/0104* (2013.01);
(Continued)

(58) Field of Classification Search
CPC ...... B60N 2/002; B60N 2/0026; B60N 2/267; B60R 21/01542; B60R 21/01512; B60R 21/01534
See application file for complete search history.

(56) References Cited

U.S. PATENT DOCUMENTS 10,500,981 B1 * 12/2019 Mahmoud .......... G08B 21/0225
11,845,390 B2 * 12/2023 Nagata .............. B60R 21/01534
(Continued)

FOREIGN PATENT DOCUMENTS

JP     2019-200498 A     11/2019
KR     10-2016251 B1     8/2019
(Continued)

OTHER PUBLICATIONS

Park et al., Device with enhanced sensing function for sensing occupants in vehicle, Aug. 22, 2019, EPO, KR 2019-0098460 A, Machine Translation of Description (Year: 2019).*

*Primary Examiner* — James A English
(74) *Attorney, Agent, or Firm* — Birch, Stewart, Kolasch & Birch, LLP

(57) ABSTRACT

A rear occupant alert device according to an embodiment comprises a first object detection unit; a second object detection unit; and a control unit configured to control operations of the first and second object detection units, wherein the first object detection unit includes a passive infrared sensor (PIR) sensor, wherein the second object detection unit includes a radar module, and the control unit is configured to control a movement of an object inside a vehicle through the first object detection unit, and to control a movement of an object through the second object detection unit when the movement of the object is not detected through the first object detection unit.

17 Claims, 6 Drawing Sheets

(52) U.S. Cl.
CPC .............. *B60R 2021/01252* (2013.01); *B60R*
*2021/01286* (2013.01); *B60Y 2400/88*
(2013.01)

(56) References Cited

U.S. PATENT DOCUMENTS

| | | | |
|---|---|---|---|
| 2001/0045733 A1 | 11/2001 | Stanley et al. | |
| 2021/0209927 A1* | 7/2021 | Hedges ................ | G08B 25/005 |
| 2021/0225152 A1* | 7/2021 | Taylor .................... | G08B 21/22 |
| 2021/0362673 A1 | 11/2021 | Jeon et al. | |
| 2022/0121888 A1* | 4/2022 | Lee ........................ | G06V 10/80 |

FOREIGN PATENT DOCUMENTS

| | | | | | |
|---|---|---|---|---|---|
| KR | 20190098460 | A | * 8/2019 | ............. | B60N 2/002 |
| KR | 10-2020-0077135 | A | 6/2020 | | |
| KR | 10-2021-0023556 | A | 3/2021 | | |
| KR | 10-2021-0100915 | A | 8/2021 | | |
| KR | 10-2021-0143577 | A | 11/2021 | | |
| WO | WO 01/94157 | A1 | 12/2001 | | |

* cited by examiner

【FIG. 1】
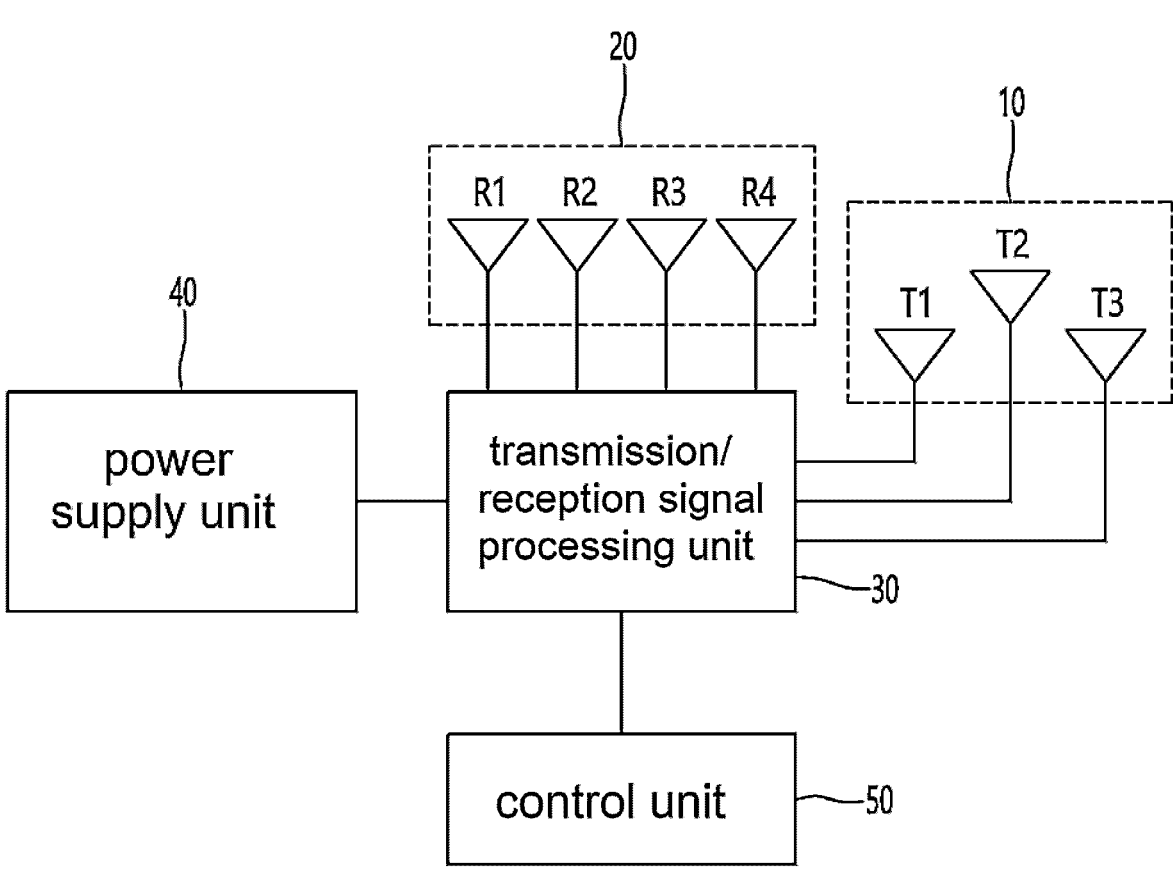

【FIG. 2】
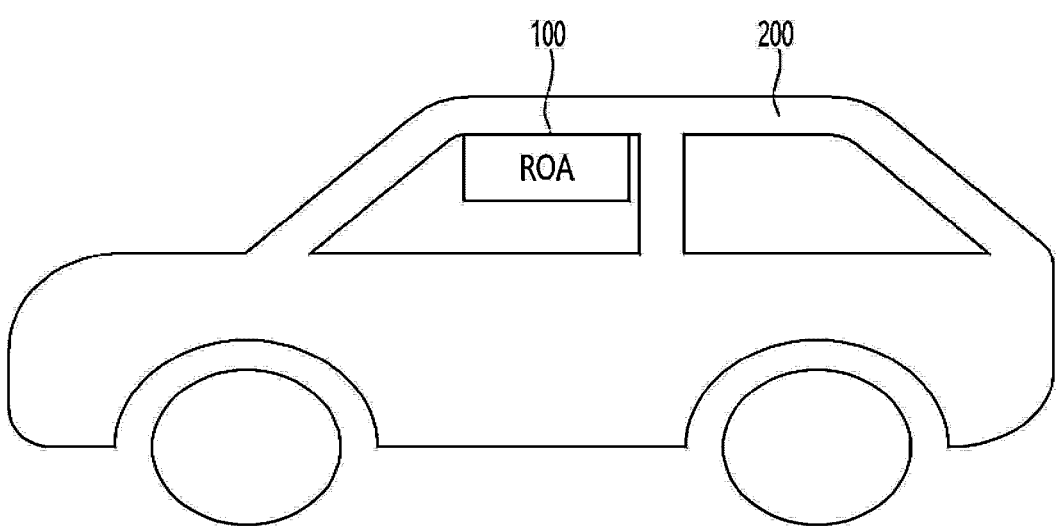

【FIG. 3】
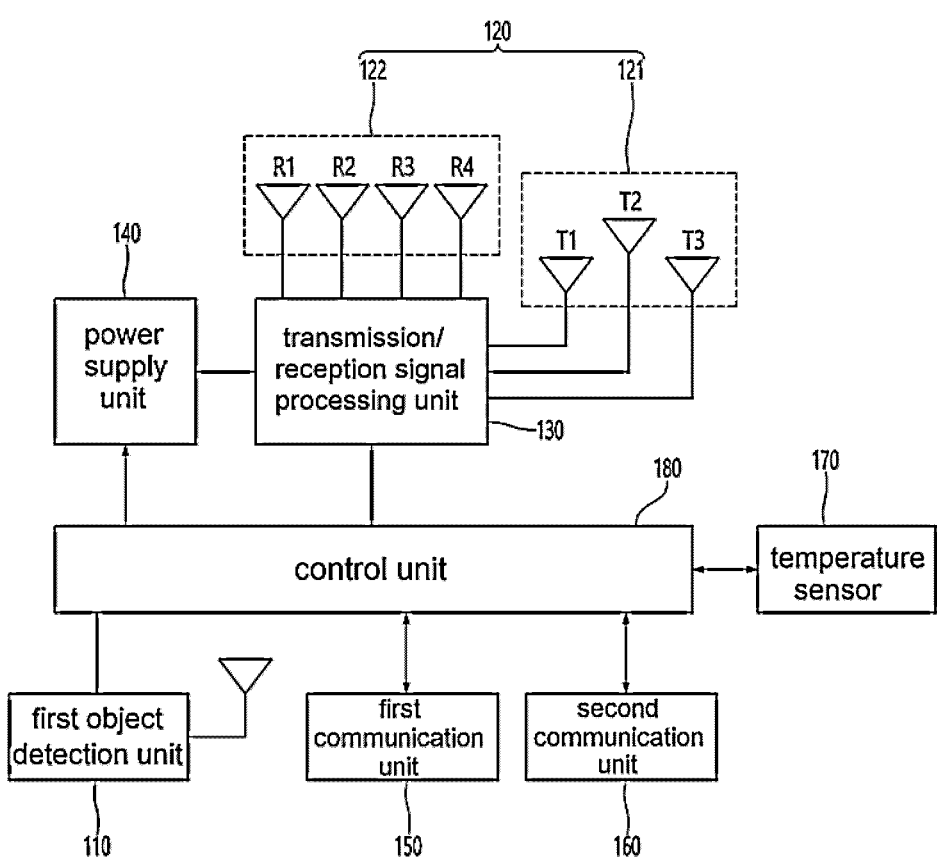

【FIG. 4】
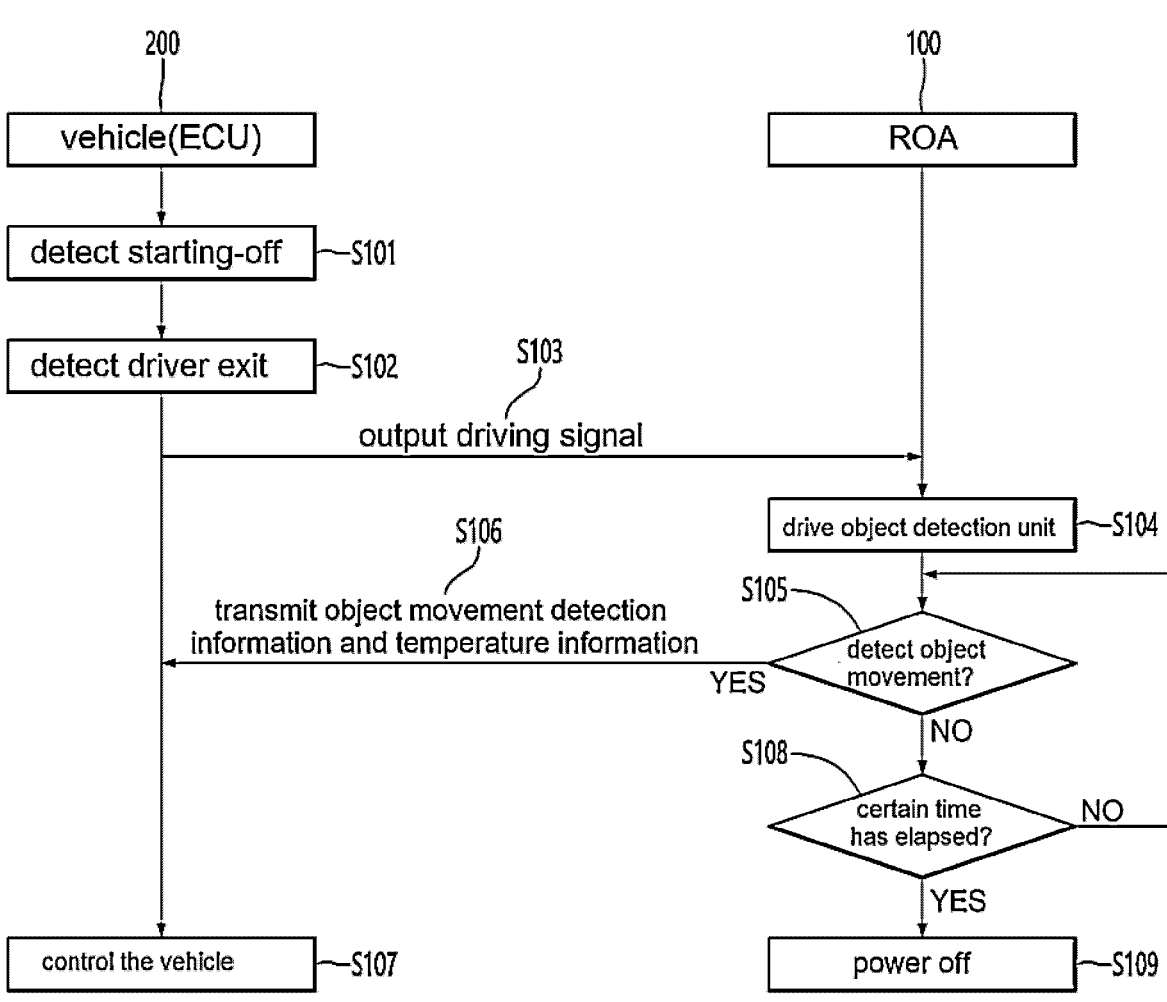

【FIG. 5】
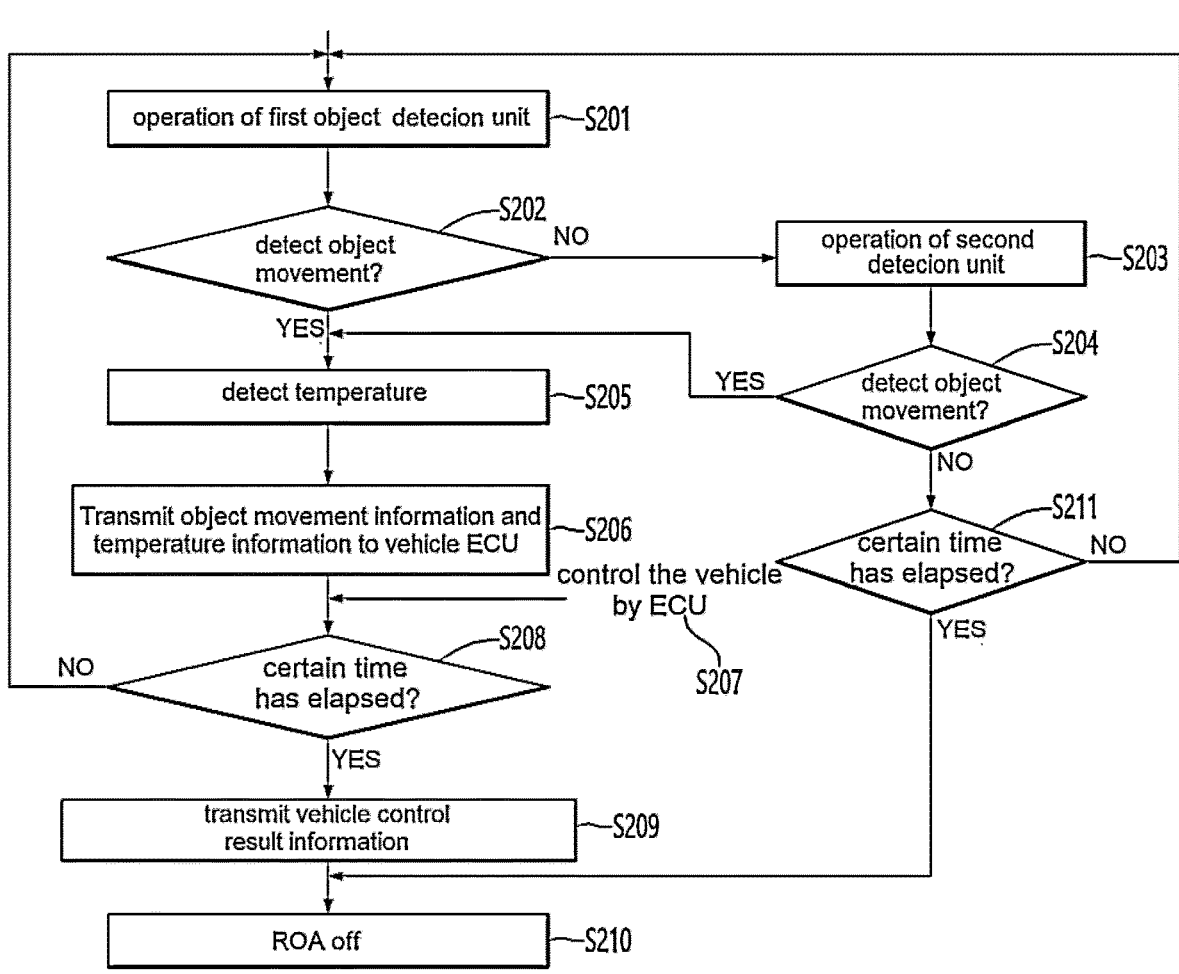

【FIG. 6】
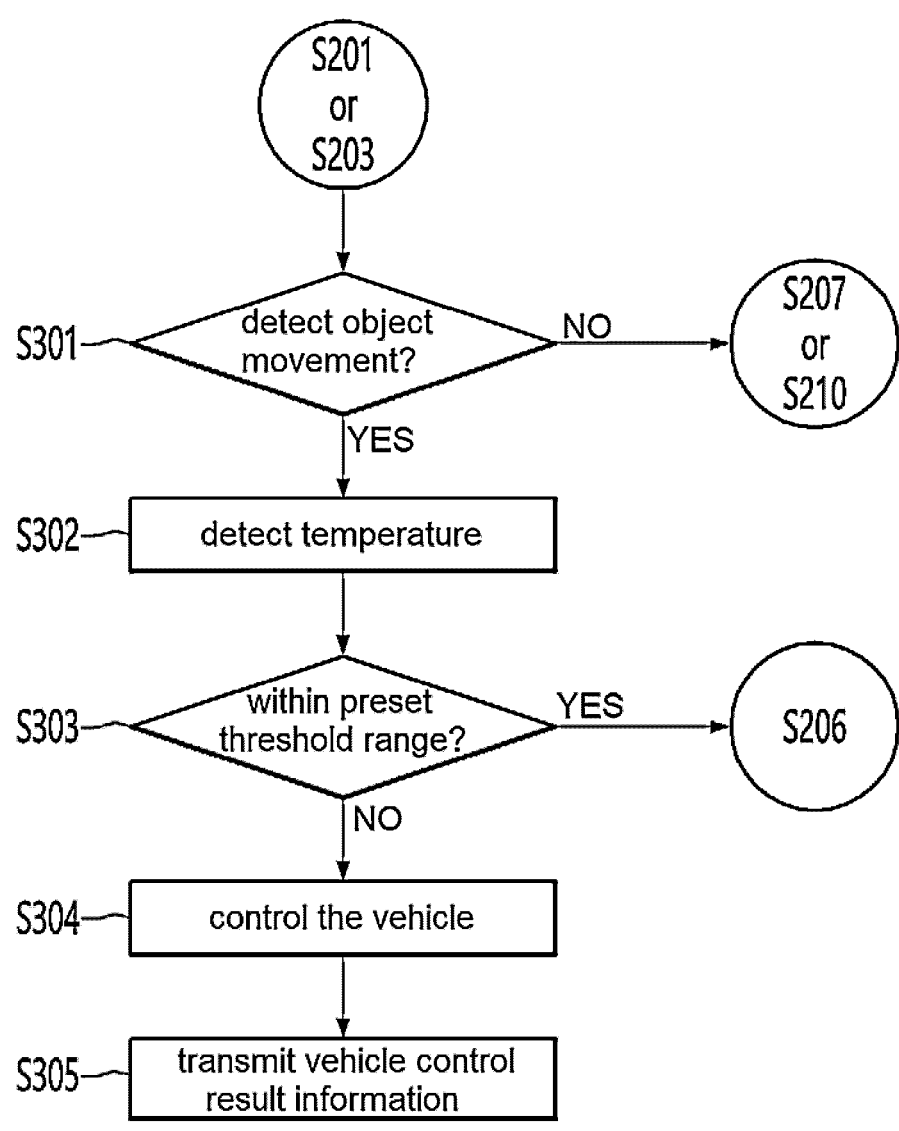

REAR OCCUPANT ALERT DEVICE AND METHOD THEREFOR

CROSS REFERENCE TO RELATED APPLICATIONS

This application is the National Phase of PCT International Application No. PCT/KR2023/001216, filed on Jan. 26, 2023, which claims priority under 35 U.S.C. 119(a) to Patent Application No. 10-2022-0012608, filed in the Republic of Korea on Jan. 27, 2022, all of which are hereby expressly incorporated by reference into the present application.

TECHNICAL FIELD

An embodiment relates to a rear occupant alert device, and in particular, to a rear occupant alert device capable of low-power operation, a vehicle including the same, and a method of controlling the same.

BACKGROUND ART

A vehicle refers to a device capable of transporting people or goods to a destination while driving on a road or track. The vehicle may move to several positions using one or more wheels installed on a vehicle body. Such vehicles may include a three-wheeled or four-wheeled vehicle, a two-wheeled vehicle such as a motorcycle, a construction machine, a bicycle or a train running on a rail disposed on a track.

In modern society, the vehicle is a most common mean of transportation, and the number of people using the vehicle is increasing. Accordingly, problems such as neglecting infants in vehicles may occur due to carelessness.

Recently, when the driver gets out of the vehicle, a rear occupant alert device (ROA) is being developed to detect whether the rear occupant, especially the territories, remain inside the vehicle and guides a detection result.

The rear occupant alert device generates a driver's seat cluster alert and an alert sound when the driver gets out of the vehicle and a rear occupant is detected. If the driver does not recognize the infant or child in a rear seat and completely gets out of the vehicle and locks the door, the rear occupant alert device activates the sensor mounted on the vehicle ceiling to detect movement inside the vehicle. Thereafter, when the rear occupant alert device detects the movement of the rear occupant, it performs at least one of the following actions: sounding a horn, flashing emergency lights, and sending a text message. Accordingly, it is possible to prevent accidents that may occur by neglecting the infant or child.

DISCLOSURE

Technical Problem

The embodiment provides a rear occupant alert device capable of low-power driving, a vehicle including the same, and a method of controlling the same. In addition, the embodiment provides a rear occupant alert device that can directly control a vehicle based on whether an occupants is detected and an internal condition of a vehicle, a vehicle including the same, and a method of controlling the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A rear occupant alert device according to an embodiment comprises a first object detection unit; a second object detection unit; and a control unit configured to control operations of the first and second object detection units, wherein the first object detection unit includes a passive infrared sensor (PIR) sensor, wherein the second object detection unit includes a radar module, and the control unit is configured to detect a movement of an object inside a vehicle through the first object detection unit, and to detect a movement of an object through the second object detection unit when the movement of the object is not detected through the first object detection unit.

In addition, the rear occupant alert device further comprises a power supply unit configured to control power supplied to the second object detection unit, and the power supply unit is configured to supply a driving power to the second object detection unit when the movement of the object is not detected through the first object detection unit based on a control signal of the control unit.

In addition, the rear occupant alert device further comprises a first communication unit configured to transmit object detection information to an ECU of a vehicle when the movement of the object is detected through the first object detection unit or the second object detection unit.

In addition, the rear occupant alert device further comprises a second communication unit configured to transmit the object detection information to a pre-registered terminal when the movement of the object is detected through the first object detection unit or the second object detection unit.

In addition, the rear occupant alert device further comprises a temperature detection unit configured to detect temperature information inside the vehicle, and the control unit is configured to transmit the detected temperature information together with the object detection information.

In addition, the control unit is configured to output a signal for controlling the vehicle when the detected temperature information is out of a preset threshold range.

In addition, the signal for controlling the vehicle includes at least one of an air conditioner control signal and a vehicle window control signal.

In addition, the control unit is configured to preferentially detect the movement of the object inside the vehicle through the first object detection unit when a signal notifying that the vehicle is starting-off and a driver exits is received through the ECU.

A method for alerting a rear occupant according to an embodiment comprises detecting that a vehicle's is stating-off and a driver exits; driving a passive infrared sensor (PIR) sensor based on a detection signal of the starting-off and the driver exiting; detecting a movement of an object inside the vehicle according to the driving of the PIR sensor; driving a radar module in response to non-detected movement of the object inside the vehicle through the PIR sensor; and re-detecting a movement of an object inside the vehicle through the driven radar module, and wherein the radar module remains in an off state until the movement of the object inside the vehicle is not detected through the PIR sensor.

In addition, if the movement of the object inside the vehicle is detected through any one of the PIR sensor and the radar module, transmitting movement detection information to at least one of an ECU of the vehicle and a pre-registered terminal.

In addition, the method further comprises detecting temperature information inside the vehicle, and the detected temperature information is transmitted along with the movement detection information to the ECU of the vehicle or a pre-registered terminal.

In addition, the method further comprises comparing the detected temperature with a preset threshold range; if the detected temperature is outside the preset threshold range, outputting a control signal for controlling at least one of an air conditioner of the vehicle and windows of the vehicle before transmitting the movement detection information.

Advantageous Effects

The embodiment primarily detects a moving object (e.g., a living thing) through a first object detection unit for a rear occupant alert operation. The first object detection unit is a sensor capable of low-power operation. In addition, when a moving object is detected through the first object detection unit, an alert function is provided for this. For example, in an embodiment, a moving object can be detected only by the operation of the first object detection unit without an operation of a second object detection unit, and thus battery consumption can be minimized.

In addition, the embodiment allows the second object detection unit to be driven only under a condition that a moving object is not detected through the first object detection unit. Accordingly, the embodiment can provide a rear occupant alert function while minimizing the operation of the second object detection unit. Furthermore, the embodiment can solve a detection error in a situation in which a living thing with subtle movements, such as an infant or a sleeping creature, is not accurately detected through the first object detection unit. In addition, the embodiment allows a more accurate detecting operation to be performed under a specific condition through the second object detection unit, and accordingly, user satisfaction may be improved.

In addition, the embodiment provides temperature data inside the vehicle at a time of alert of the rear occupant. Accordingly, the embodiment may secure safety of objects existing inside the vehicle, and accordingly, user satisfaction may be improved.

In addition, the embodiment can further ensure the safety of the object by allowing the rear occupant alert device to control the vehicle on its own. For example, when the temperature inside the vehicle is too low or too high, the embodiment allows for immediate vehicle control. Accordingly, the embodiment may further secure the safety of the object, and accordingly, user satisfaction may be improved.

DESCRIPTION OF DRAWINGS

FIG. 1 is a diagram illustrating a rear occupant alert device according to a comparative example.

FIG. 2 is a schematic diagram of a rear occupant alert system according to an embodiment.

FIG. 3 is a illustrating a configuration of the rear occupant alert device shown in FIG. 2.

FIG. 4 is a flowchart for step-by-step explaining a method for controlling a rear occupant alert system according to an embodiment.

FIGS. 5 and 6 are flowcharts for step-by-step explaining a method for controlling a rear occupant alert device according to an embodiment.

MODES OF THE INVENTION

Hereinafter, exemplary embodiments of the present invention will be described in detail with reference to the accompanying drawings, wherein like reference numerals are used to designate identical or similar elements, and redundant description thereof will be omitted. The suffix "module" and "portion" of the components used in the following description are only given or mixed in consideration of ease of preparation of the description, and there is no meaning or role to be distinguished as it is from one another. Also, in the following description of the embodiments of the present invention, a detailed description of related arts will be omitted when it is determined that the gist of the embodiments disclosed herein may be obscured. Also, the accompanying drawings are included to provide a further understanding of the invention, are incorporated in, and constitute a part of this description, and it should be understood that the invention is intended to cover all modifications, equivalents, or alternatives falling within the spirit and scope of the invention.

Terms including ordinals, such as first, second, etc., may be used to describe various components, but the elements are not limited to these terms. The terms are used only for distinguishing one component from another.

When a component is referred to as being "connected" or "contacted" to another component, it may be directly connected or joined to the other component, but it should be understood that other component may be present therebetween. When a component is referred to as being "directly connected" or "directly contacted" to another component, it should be understood that other component may not be present therebetween.

A singular representation includes plural representations, unless the context clearly implies otherwise.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

Hereinafter, embodiments of the present invention will be described in detail with reference to the attached drawings.

Before describing an embodiment, a rear occupant alert device according to a comparative example will be described.

FIG. 1 is a diagram illustrating a rear occupant alert device according to a comparative example.

Referring to FIG. 1, the rear occupant alert device of the comparative example includes an object detection unit, a transmission/reception signal processing unit 30, a power supply unit 40, and a control unit 50.

The object detection unit is a radar unit. The object detection unit includes a transmitting antenna unit 10 and a receiving antenna unit 20.

The transmitting antenna unit 10 transmits a transmission signal. The transmitting antenna unit 10 includes a plurality of transmitting antenna arrays.

The receiving antenna unit 20 receives a reception signal. The receiving antenna unit 20 includes a plurality of receiving antenna arrays.

The transmission/reception signal processing unit 30 is connected to the object detection unit. The transmission/reception signal processing unit 30 is connected to the transmitting antenna unit 10 and may transmit a transmission signal to the transmitting antenna unit 10.

The transmission/reception signal processing unit 30 is connected to the receiving antenna unit 20 and may process a reception signal received through the receiving antenna unit 20.

The power supply unit 40 may supply driving power to each component constituting the rear occupant alert device. For example, the power supply unit 40 may supply power to the transmitting antenna unit 10, the receiving antenna unit 20, and the transmission/reception signal processing unit 30.

For example, the power supply unit 40 may manage power supplied to the transmitting antenna unit 10, the receiving antenna unit 20, and the transmission/reception signal processing unit 30.

The control unit 50 controls an overall operation of the rear occupant alert device.

The control unit 50 controls an object detection unit when a rear occupant alert activation condition is detected. For example, the control unit 50 controls the power supply unit 40 when starting-off and driver exit are detected. For example, the control unit 50 supplies driving power to the transmitting antenna unit 10 and the receiving antenna unit 20 through the power supply unit 40.

In addition, the control unit 50 allows a transmission signal to be transmitted to the transmitting antenna unit 10 through the transmission/reception signal processing unit 30.

Furthermore, the control unit 50 processes a reception signal received through the receiving antenna unit 20.

In addition, the control unit 50 determines whether a movement of an object is detected using the processed reception signal. For example, the control unit 50 detects a presence of an object having movement, for example, a living thing.

In this case, the rear occupant alert operation as described above is operated for a predetermined time after the vehicle is staring-off. For example, the rear occupant alert operation is operated for 10 minutes. In this case, operations of the transmitting antenna unit 10, the receiving antenna unit 20, and the transmission/reception signal processing unit 30 are performed for about 10 minutes for the rear occupant alert operation. Accordingly, several watts of power are consumed for the rear occupant alert operation.

In addition, the rear occupant alert operation as described above consumes the vehicle's battery while the vehicle is starting-off.

Accordingly, it is necessary to minimize battery consumption during the rear occupant alert operation.

In addition, in the comparative example, when a rear occupant is detected (e.g., the existence of a living thing), only an alert function is provided to notify the existence of the above living thing.

Accordingly, a new rear occupant alert function is required to ensure the safety of the rear occupant while minimizing the battery consumption of the vehicle.

FIG. 2 is a schematic diagram of a rear occupant alert system according to an embodiment, and FIG. 3 is a illustrating a configuration of the rear occupant alert device shown in FIG. 2.

Referring to FIGS. 2 and 3, the rear occupant alert system includes a rear occupant alert device 100 and a vehicle 200.

The rear occupant alert device 100 may be provided in the vehicle 200.

For example, the rear occupant alert device 100 may be provided inside the vehicle 200.

The rear occupant alert device 100 may operate in a specific state of the vehicle 200 to perform a rear occupant detection operation and provide an alert function accordingly.

To this end, the rear occupant alert device 100 may include a first object detection unit 110, a second object detection unit 120, a transmission/reception signal processing unit 130, a power supply unit 140, a first communication unit 150, a second communication unit 160, a temperature sensor 170, and a control unit 180.

The first object detection unit 110 may detect a movement of an object inside the vehicle in a first method. For example, the first object detection unit 110 may detect a presence of an object having movement inside the vehicle. For example, the first object detection unit 110 may detect the presence of a living thing inside the vehicle.

The first object detection unit 110 may include a sensor which may be driven with low power. For example, the first object detection unit 110 may be an infrared human body detection sensor. That is, the first object detection unit 110 may be a passive infrared sensor (PIR) sensor.

The PIR sensor refers to a passive infrared sensor and can detect human movement in a certain section at an acute angle of 9 to 12 degrees through a Fresnel lens.

The PIR sensor may generate counting errors due to masking effects depending on the characteristics of the sensor, and may include an algorithm to reduce a range of the errors.

The PIR sensor may be driven with very little current consumption, and thus may be driven for a long time without a separate external power source.

Accordingly, in an embodiment, a movement of an object existing inside the vehicle may be detected under a specific condition by using the first object detection unit 110 including the PIR sensor.

The rear occupant alert device 100 includes a second object detection unit 120. The second object detection unit 120 may detect a movement of an object inside the vehicle. In particular, the second object detection unit 110 may detect a moving object in a second method different from the first method of the first object detection unit 110.

For example, the second object detection unit 120 may detect information on a surrounding environment through electromagnetic waves and detect the presence of an movement object accordingly. Preferably, the second object detection unit 120 may include a radar module.

The second object detection unit 120 may perform a function of transmitting and receiving a wireless signal. That is, the second object detection unit 120 may transmit a transmission signal to the air and receive a reception signal from the air accordingly. For example, the transmission signal may mean a wireless signal transmitted from the second object detection unit 120. In addition, the reception signal may mean a wireless signal introduced into the second object detection unit 120 as the transmitted transmission signal is reflected by a target (e.g., an object).

To this end, the second object detection unit 120 may include a transmitting antenna unit 121 and a receiving antenna unit 122.

The transmitting antenna unit 121 may include a plurality of transmitting antennas. For example, the transmitting antenna unit 121 may include a first transmitting antenna T1, a second transmitting antenna T2, and a third transmitting antenna T3. In this case, the transmitting antenna unit 121 includes three transmitting antennas in the drawing, but the embodiment is not limited thereto. For example, the transmitting antenna unit 121 may include two or less transmitting antennas and may include four or more transmitting antennas.

At least one of the first transmitting antenna T1, the second transmitting antenna T2, and the third transmitting antenna T3 may have a structure different from that of the at least one other transmitting antenna. For example, the second transmitting antenna T2 disposed at a center among the first transmitting antenna T1, the second transmitting antenna T2, and the third transmitting antenna T3 may have a structure different from those of the first transmitting antenna T1 and the third transmitting antenna T3. For example, the second transmitting antenna T2 may be a vertical polarization transmitting antenna for detecting in a vertical direction. For example, the first transmitting antenna T1 and the third transmitting antenna T3 may be horizontal polarization transmitting antennas for detecting in a horizontal direction.

The receiving antenna unit 122 may receive a reception signal for a transmission signal transmitted through the transmitting antenna unit 121. For example, the receiving antenna unit 122 may receive a reflected signal as the transmission signal transmitted from the transmitting antenna unit 121 is reflected by an object.

The receiving antenna unit 122 may include a plurality of receiving antennas.

For example, the receiving antenna unit 122 may include a first receiving antenna R1, a second receiving antenna R2, a third receiving antenna R3, and a fourth receiving antenna R4. For example, the receiving antenna unit 122 may include a plurality of receiving antennas.

The second object detection unit 120 as described above may be driven under a specific condition according to a control signal from the control unit 180 to be described later to perform an object detection function.

The rear occupant alert device 100 includes a transmission/reception signal processing unit 130.

The transmission/reception signal processing unit 130 may be a millimeter wave radio frequency IC (RFIC), but is not limited thereto.

The transmission/reception signal processing unit 130 may be connected to the second object detection unit 120. The transmission/reception signal processing unit 130 may be connected to the transmitting antenna unit 121 and the receiving antenna unit 122, respectively.

In this case, the transmission/reception signal processing unit 130 may include a transmission device connected to the transmitting antenna unit 121 and a reception device connected to the receiving antenna unit 122. However, embodiments are not limited thereto. For example, the transmission/reception signal processing unit 130 may be an integrated device commonly connected to the transmitting antenna unit 121 and the receiving antenna unit 122.

The transmission/reception signal processing unit 130 may perform a signal processing function according to an operation of the second object detection unit 120. For example, the transmission/reception signal processing unit 130 may process a transmission signal and a reception signal.

The transmission/reception signal processing unit 130 may generate a transmission signal using transmission data. The transmission/reception signal processing unit 130 may output a transmission signal to the transmitting antenna 121. To this end, the transmission/reception signal processing unit 130 may include an oscillation unit (not shown), for example, a voltage controlled oscillator (VCO) and an oscillator.

Also, the transmission/reception signal processing unit 130 may receive a reception signal from the receiving antenna unit 122.

To this end, the transmission/reception signal processing unit 130 may include a low noise amplifier (LNA) and an analog-to-digital converter (ADC). The low noise amplifier may amplify a reception signal with low noise, and the analog-to-digital converter may generate a reception signal by converting a reception signal from an analog signal to a digital data.

The power supply 140 may perform a power management operation.

For example, the power supply unit 140 may supply power to each component constituting the rear occupant alert device 100. In addition, the power supply unit 140 may manage or control power supplied to each component constituting the rear occupant alert device 100.

For example, the power supply 140 may cut off power supplied to the second object detection unit 120 in a first condition. For example, the power supply 140 may supply power to the second object detection unit 120 in the second condition.

That is, the power supply 140 may control power supplied to the second object detection unit 120 based on a control signal of the control unit 180. The power supply 140 may be a power management unit (PMIC), but is not limited thereto.

A first communication unit 150 may communicate with the vehicle 200. Preferably, the first communication unit 150 may communicate with an ECU of the vehicle 200.

Accordingly, the first communication unit 150 may include a communication module (not shown) for communication with electronic devices inside the vehicle. For example, the first communication unit 150 may include a communication module that performs communication based on at least one communication protocol such as a controller area network (CAN), a local interconnection network (LIN), a Flex-Ray, and Ethernet.

The second communication unit 160 may communicate with an external device. For example, the second communication unit 160 may communicate with a pre-registered terminal. For example, the second communication unit 160 may communicate with a user terminal. For example, the second communication unit 160 may communicate with a terminal registered by a driver. Also, the second communication unit 160 may communicate with a server. For example, the second communication unit 160 may communicate with a specific server that manages an emergency signal and, based on this, secures user safety.

The second communication unit 160 may be a wireless communication unit. For example, the second communication unit 160 may include a module for accessing to the wireless internet. For example, the second communication unit 160 is configured to transmit and receive wireless signals in a communication network according to wireless Internet technologies.

Wireless Internet technologies include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), and WiMAX (It may include World Interoperability for Microwave Access), HSDPA (High Speed Downlink Packet Access), HSUPA (High Speed Uplink Packet Access), LTE (Long Term Evolution), LTE-A (Long Term Evolution-Advanced), etc., but the embodiment is not limited thereto.

Alternatively, the second communication unit 160 may be a short range communication unit. For example, the second communication unit 160 may include a short range communication module. In this case, the short range communication module may support short range communication by using at least one of Bluetooth™, radio frequency identification (RFID), infrared data association (UWB), ultra-wideband (UWB), ZigBee, near field communication (FC), wireless-fidelity (Wi-Fi), Wi-Fi Direct, and wireless universal serial bus (USB) technologies.

The rear occupant alert device 100 includes a temperature sensor 170.

The temperature sensor 170 may function to detect an internal temperature of the vehicle. In this case, the temperature sensor 170 may operate in conjunction with an operation of the rear occupant alert device 100. For example, the temperature sensor 170 may perform an operation at a time point when rear occupant alert is required.

For example, the temperature sensor 170 may function to detect the temperature inside the vehicle when the movement of the object is detected through the first object detection unit 110 or the second object detection unit 120.

The control unit 180 may control an overall operation of the rear occupant alert device 100. For example, the control unit 180 may determine whether to activate the rear occupant alert operation through communication with the ECU of the vehicle 200.

For example, the control unit 180 may receive an activation signal from the ECU of the vehicle 200 when the vehicle is starting-off and the driver's exit is detected.

In addition, the control unit 180 may detect an object using at least one of the first object detection unit 110 and the second object detection unit 120 based on the received activation signal.

Preferably, in an embodiment, battery consumption is minimized during the rear occupant alert device 100. In this case, in the comparative example, when the rear occupant alert device is operated, the radar module is always operated regardless of conditions.

Alternatively, in the embodiment, the radar module with a high power consumption is operated only under specific conditions, thereby minimizing battery consumption.

For example, during the object detection operation, the control unit 180 performs a priority object detection operation through the first object detection unit 110.

In this case, when an object having a large movement exists inside the vehicle, the object may be detected by the first object detection unit 110. Accordingly, when an object having movement is detected through the first object detection unit 110, the control unit 180 may perform an alert operation corresponding thereto.

That is, the object having a large movement as described above may be accurately detected by the first object detection unit 110. Accordingly, in an embodiment, an object having movement may be detected only by driving the first object detection unit 110 without driving the second object detection unit 120. Accordingly, in an embodiment, the operation of the second object detection unit 120 may be selectively omitted and power consumption may be minimized by preferentially detecting the object having movement through the first object detection unit 110.

Meanwhile, it may be difficult to accurately detect an object having a small movement due to the characteristics of the first object detection unit 110. For example, even if a living thing exists in the vehicle, the living thing may not be detected by the first object detection unit 110. For example, the first object detection unit 110 may have a missed detection (MD) error.

In addition, when the MD error of the first object detection unit 110 occurs, the control unit 180 allows the second object detection unit 120 to be driven, and accordingly, accurate detection of living things or infants in a sleeping state may be performed.

Meanwhile, the first object detection unit 110 may include a false detection (FD) error for detecting that an object exists even when a moving object does not exist. For example, the first object detection unit 110 may cause a malfunction due to wind or the like in an outdoor space, and may have a FD error accordingly. In this case, the first object detection unit 110 according to an embodiment is installed inside the vehicle. Accordingly, the first object detection unit 110 may not have a FD error. Accordingly, the embodiment may accurately detect the presence of a moving object existing inside the vehicle according to selective driving of the first object detection unit 110 and the second object detection unit 120.

When a moving object is detected through any one of the first object detection unit 110 and the second object detection unit 120, the control unit 180 may perform an alert operation for the detected object.

For example, when the moving object is detected, the control unit 180 may transmit information notifying the existence of the object to the ECU of the vehicle 200 through the first communication unit 150. Also, when the moving object is detected, the control unit 180 transmits information notifying the existence of the object to a pre-registered terminal through the second communication unit 160.

In this case, the control unit 180 allows temperature data obtained through the temperature sensor 170 to be transmitted to the ECU and the terminal together with information notifying the existence of the object. For example, when the inside of the vehicle is too cold or too hot, this may cause major problems with the safety of the object. Accordingly, the control unit 180 may allow the temperature data to be transmitted to the ECU and the terminal so as to immediately respond to this.

Thereafter, the control unit 180 may perform vehicle control based on the transmitted information. For example, the control unit 180 may perform vehicle control such as flashing an emergency light, outputting an instrument panel, and generating a horn. In this case, the vehicle control may be performed by the exclusive control of the control unit 180, or may be performed by the control of the ECU differently.

For example, if the vehicle control is not performed even after the transmission of the information, the control unit 180 may independently perform a vehicle control operation to ensure the safety of the object.

In addition, the control unit 180 may control heater operation or air conditioner operation based on the obtained temperature data when controlling the vehicle.

Furthermore, the control unit 180 performs a window opening operation of the vehicle to ensure the safety of the object.

As described above, the embodiment primarily detects a moving object (e.g., a living thing) through a first object detection unit 110 for a rear occupant alert operation. The first object detection unit 110 is a sensor capable of low-power operation. In addition, when a moving object is detected through the first object detection unit 110, an alert function is provided for this. For example, in an embodiment, a moving object can be detected only by the operation of the first object detection unit 110 without an operation of a second object detection unit 120, and thus battery consumption can be minimized.

In addition, the embodiment provides temperature data inside the vehicle at a time of alert of the rear occupant.

Accordingly, the embodiment may secure safety of objects existing inside the vehicle, and accordingly, user satisfaction may be improved.

In addition, the embodiment can further ensure the safety of the object by allowing the rear occupant alert device to control the vehicle on its own. For example, when the temperature inside the vehicle is too low or too high, the embodiment allows for immediate vehicle control. Accordingly, the embodiment may further secure the safety of the object, and accordingly, user satisfaction may be improved.

Hereinafter, a rear occupant alert method according to an embodiment will be described step by step.

FIG. 4 is a flowchart for step-by-step explaining a method for controlling a rear occupant alert system according to an embodiment.

Referring to FIG. 4, an ECU of the vehicle 200 may detect that the vehicle is starting-off (S101).

Then, the ECU of the vehicle 200 may detect whether the driver exits (S102). In this case, the driver's exit may be detected using a pressure sensor or the like provided in a vehicle seat.

In addition, when the driver's exit is detected, the ECU of the vehicle 200 may output a driving signal to the rear occupant alert device 100 (S103). For example, when the driver's exit is detected, the ECU of the vehicle 200 may detect a moving object and notify a rear occupant accordingly through the rear occupant alert device 100 for a predetermined time.

Accordingly, the rear occupant alert device 100 may drive the object detection unit based on the driving signal (S104). In this case, the object detection unit includes a first object detection unit 110 and a second object detection unit 120. In addition, the rear occupant alert device 100 detects the existence of a moving object through selective operations of the first object detection unit 110 and the second object detection unit 120.

In addition, the rear occupant alert device 100 determines whether a moving object has been detected through the object detection unit (S105).

In addition, when the moving object is detected, the rear occupant alert device 100 transmits object movement detection information and temperature information to the ECU of the vehicle 200 (S106). In addition, the rear occupant alert device 100 may transmit the object movement detection information and temperature information to a pre-registered terminal.

Accordingly, the ECU of the vehicle 200 controls the vehicle to secure the safety of the object having the detected movement (S107). For example, the ECU of the vehicle 200 may control an air conditioner operation or a window operation of the vehicle based on the temperature information.

On the other hand, the rear occupant alert device 100 determines whether a certain time has elapsed when the moving object is not detected (S108).

In addition, the rear occupant alert device (100) may turn off the power to end the rear occupant alert operation when the predetermined time has elapsed.

Alternatively, when a predetermined time has not elapsed, the rear occupant alert device 100 may return to the step S015 and function to detect the presence of an object having continuous movement.

FIGS. 5 and 6 are flowcharts for step-by-step explaining a method for controlling a rear occupant alert device according to an embodiment.

FIG. 5 may be for describing operations of S104, S105, S106, S108, and S109 of FIG. 4 in more detail.

Referring to FIG. 5, when the rear occupant alert function is activated, the control unit 180 may preferentially operate the first object detection unit 110 to perform an object detecting operation corresponding thereto (S201).

Thereafter, the control unit 180 may determine whether an object having movement is detected through the first object detection unit 110 (S202).

Furthermore, when a moving object is not detected through the first object detection unit 110, the control unit 180 operates the second object detection unit 120 for a more detailed object detection operation (S203). To this end, the control unit 180 outputs a control signal to the power supply unit 140 to supply driving power to the second object detection unit 120 accordingly. In this case, the second object detection unit 120 operates in an off state until the driving power is supplied.

Thereafter, the second object detection unit 120 may be activated according to the driving power to detect the presence of a moving object (S204).

In this case, when a moving object is detected in the step S202 or a moving object is detected in the step 204, the control unit 180 may acquire temperature data detected through the temperature sensor 170 (S205).

Thereafter, the control unit 180 may transmit information notifying the presence of the moving object and the temperature data to the ECU of the vehicle 200 (S206). In this case, the control unit 180 may transmit information notifying the presence of the object and the temperature data to a pre-registered user terminal.

Accordingly, the ECU of the vehicle 200 may control the vehicle based on the temperature data in response to the information notifying the existence of the object (S207).

Thereafter, the control unit 180 determines whether a predetermined time has elapsed (S208). For example, a general rear occupant alert function may be performed for a predetermined time regardless of the detection result of the object.

Furthermore, if the predetermined time has not elapsed as a result of the determination (S208), the control unit 180 may return to the step (S201) to perform an additional object detection operation. Furthermore, if the predetermined time has elapsed as a result of the determination (S208), the control unit 180 transmits information according to the result of the rear occupant alert operation, for example, vehicle control result information, and the like to the user terminal (S209).

Thereafter, the control unit 180 may turn off the power of the rear occupant alert device 100 (S210).

Meanwhile, if the movement of the object is not detected as a result of the determination (S204), the control unit 180 determines whether a predetermined time has elapsed (S211). For example, a general rear occupant alert function may be performed for a preset time regardless of the detection result of the object.

In addition, if the predetermined time has not elapsed as a result of the determination, the control unit 180 may return to the step S201 and perform an additional object detection operation (S210). In addition, if the predetermined time has elapsed as a result of the determination (S211), the control unit 180 may enter the step S210 and turn off the ROA.

Meanwhile, the rear occupant alert function is performed for a predetermined time, but the embodiment is not limited thereto. For example, in an embodiment, a rear occupant alert off signal may be received from a user, and accordingly, the rear occupant alert function may be turned off even when the predetermined time has not elapsed.

Meanwhile, referring to FIG. 6, the control unit 180 determines whether a moving object is detected after the step S201 or the step S203 (S301). In this case, when the moving object is not detected, the step S207 or the step S210 may be entered.

In addition, when a moving object is detected, the control unit 180 receives temperature data acquired through the temperature sensor 170 (S302).

Thereafter, the control unit 180 determines whether the acquired temperature data is within a preset threshold range (S303).

In addition, the control unit 180 enters the step S206 when the acquired temperature data is within a preset threshold range.

Alternatively, when the acquired temperature data is out of a preset threshold range, the control unit 180 performs an immediate vehicle control operation for safety of the object (S304). For example, the control unit 180 may drive the air conditioner or control a window state of the vehicle based on the temperature data (S304).

In addition, the control unit 180 transmits information notifying that the vehicle control has been performed to at least one of the vehicle's ECU and pre-registered terminals (S305).

The embodiment primarily detects a moving object (e.g., a living thing) through a first object detection unit for a rear occupant alert operation. The first object detection unit is a sensor capable of low-power operation. In addition, when a moving object is detected through the first object detection unit, an alert function is provided for this. For example, in an embodiment, a moving object can be detected only by the operation of the first object detection unit without an operation of a second object detection unit, and thus battery consumption can be minimized.

In addition, the embodiment provides temperature data inside the vehicle at a time of alert of the rear occupant. Accordingly, the embodiment may secure safety of objects existing inside the vehicle, and accordingly, user satisfaction may be improved.

In addition, the embodiment can further ensure the safety of the object by allowing the rear occupant alert device to control the vehicle on its own. For example, when the temperature inside the vehicle is too low or too high, the embodiment allows for immediate vehicle control. Accordingly, the embodiment may further secure the safety of the object, and accordingly, user satisfaction may be improved.

Embodiments are mostly described above, but the embodiments are merely examples and do not limit the embodiments, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the embodiment defined in the following claims.

The invention claimed is:

1. A rear occupant alert device comprising:
a first object detection unit;
a second object detection unit; and
a control unit configured to control operations of the first and second object detection units,
wherein the first object detection unit includes a passive infrared sensor (PIR) sensor,
wherein the second object detection unit includes a radar module,

wherein the control unit is configured to drive the first object detection unit when a signal notifying that a vehicle is turned off and a driver exits is received through an ECU of the vehicle, detect a movement of an object inside the vehicle according to the driving of the first object detection unit, drive the second object detection unit in response to non-detected movement of the object inside the vehicle through the first object detection unit, and re-detect a movement of the object inside the vehicle through the second object detection unit, and
wherein the second object detection unit remains in an off state until the movement of the object inside the vehicle is not detected through the first object detection unit.

2. The rear occupant alert device of claim 1, further comprising:
a power supply unit configured to control power supplied to the second object detection unit, and
wherein the power supply unit is configured to supply a driving power to the second object detection unit when the movement of the object is not detected through the first object detection unit based on a control signal of the control unit.

3. The rear occupant alert device of claim 1, further comprising:
a first communication unit configured to transmit object detection information to an ECU of the vehicle when the movement of the object is detected through the first object detection unit or the second object detection unit.

4. The rear occupant alert device of claim 3, further comprising:
a second communication unit configured to transmit the object detection information to a pre-registered terminal when the movement of the object is detected through the first object detection unit or the second object detection unit.

5. The rear occupant alert device of claim 4, further comprising:
a temperature detection unit configured to detect temperature information inside the vehicle, and
wherein the control unit is configured to transmit the detected temperature information together with the object detection information.

6. The rear occupant alert device of claim 5, wherein the control unit is configured to output a signal for controlling the vehicle when the detected temperature information is out of a preset threshold range.

7. The rear occupant alert device of claim 6, wherein the signal for controlling the vehicle includes at least one of an air conditioner control signal and a vehicle window control signal.

8. The rear occupant alert device of claim 4, wherein the control unit allows vehicle control result information to be transmitted through the second communication unit.

9. The rear occupant alert device of claim 1, wherein the second object detection unit does not operate under a condition in which the movement of the object is detected through the first object detection unit.

10. A method for alerting a rear occupant comprising:
detecting that a vehicle is turned off and a driver exits;
driving a passive infrared sensor (PIR) sensor based on a detection signal of the vehicle being turned off and the driver exiting;
detecting a movement of an object inside the vehicle according to the driving of the PIR sensor;

driving a radar module in response to non-detected movement of the object inside the vehicle through the PIR sensor; and re-detecting a movement of the object inside the vehicle through the driven radar module, wherein the radar module remains in an off state until the movement of the object inside the vehicle is not detected through the PIR sensor.

11. The method of claim 10, wherein if the movement of the object inside the vehicle is detected through any one of the PIR sensor and the radar module, transmitting movement detection information to at least one of an ECU of the vehicle and a pre-registered terminal.

12. The method of claim 11, further comprising:

supplying driving power for driving the radar module when the movement of the object is not detected through the PIR sensor.

13. The method of claim 11, further comprising:

detecting temperature information inside the vehicle, and wherein the detected temperature information is transmitted together with the movement detection information.

14. The method of claim 13, further comprising:

comparing the detected temperature information with a preset threshold range; and controlling a state of the vehicle before transmission of the movement detection information when the detected temperature information is out of a preset threshold range.

15. The method of claim 14, wherein the controlling the state of the vehicle includes controlling at least one of an air conditioner of the vehicle and a window of the vehicle.

16. The method of claim 15, further comprising:

transmitting vehicle control result information together with the temperature information and the movement detection information.

17. The method of claim 12, wherein the radar module does not operate under a condition in which the movement of the object is detected through the PIR sensor.

\* \* \* \* \*